United States Patent [19]

Clarke et al.

[11] Patent Number: 5,297,508

[45] Date of Patent: Mar. 29, 1994

[54] VARIABLE CAMSHAFT DRIVE SYSTEM FOR INTERNAL COMBUSTION ENGINE

[75] Inventors: James R. Clarke, Northville; Aladar O. Simko, Dearborn Heights; Robert A. Stein, Northville, all of Mich.

[73] Assignee: Ford Motor Company, Dearborn, Mich.

[21] Appl. No.: 85,802

[22] Filed: Jul. 6, 1993

[51] Int. Cl.⁵ ............................................. F01L 1/34
[52] U.S. Cl. ........................... 123/90.17; 123/90.31
[58] Field of Search ............ 123/90.15, 90.17, 90.31

[56] References Cited

U.S. PATENT DOCUMENTS

| | | | |
|---|---|---|---|
| 2,488,361 | 11/1949 | Witzky et al. | 74/395 |
| 3,827,413 | 8/1974 | Meacham | 123/90.15 |
| 4,535,731 | 8/1985 | Banfi | 123/90.15 |
| 4,716,864 | 1/1988 | Binder | 123/90.31 |
| 4,726,331 | 2/1988 | Oyaizu | 123/90.15 |
| 4,754,727 | 7/1988 | Hampton | 123/90.15 |
| 4,787,345 | 11/1988 | Thoma | 123/90.15 |
| 4,841,924 | 6/1989 | Hampton et al. | 123/90.15 |
| 4,856,456 | 8/1989 | Denz et al. | 123/90.15 |
| 4,862,845 | 9/1989 | Butterfield et al. | 123/90.15 |
| 4,889,086 | 12/1989 | Scapecchi et al. | 123/90.15 |
| 5,088,456 | 2/1992 | Suga | 123/90.17 |
| 5,088,457 | 2/1992 | Ferrazzi | 123/90.31 |
| 5,099,805 | 3/1992 | Ingalls | 123/90.15 |
| 5,103,780 | 4/1992 | Ishii | 123/90.15 |
| 5,109,813 | 5/1992 | Trzmiel et al. | 123/90.15 |
| 5,117,785 | 6/1992 | Suga et al. | 123/90.17 |
| 5,117,786 | 6/1992 | Trzmiel et al. | 123/90.31 |
| 5,129,370 | 7/1992 | Suga et al. | 123/90.17 |
| 5,150,671 | 9/1992 | Suga | 123/90.17 |
| 5,152,262 | 10/1992 | Parker | 123/90.31 |
| 5,161,497 | 11/1992 | Simko et al. | 123/90.15 |
| 5,181,485 | 1/1993 | Hirose et al. | 123/90.31 |
| 5,184,581 | 2/1993 | Aoyama et al. | 123/90.31 |
| 5,197,420 | 3/1993 | Arnold et al. | 123/90.31 |

*Primary Examiner*—Raymond A. Nelli
*Assistant Examiner*—Weilun Lo
*Attorney, Agent, or Firm*—Jerome R. Drouillard; Roger L. May

[57] ABSTRACT

A variable camshaft drive system for an internal combustion engine includes a primary camshaft phaser interposed between the engine crankshaft and a first camshaft. A secondary camshaft phaser determines the phase relationship between the first camshaft and a second camshaft driven by the first camshaft and which is located on the same bank of cylinders as the first camshaft. The operation of each phaser is controlled by an electronic controller which samples one or more engine operating parameters.

5 Claims, 2 Drawing Sheets

5,297,508

VARIABLE CAMSHAFT DRIVE SYSTEM FOR INTERNAL COMBUSTION ENGINE

FIELD OF THE INVENTION

The present invention is related to a variable drive system for operating the cylinder valves of a reciprocating internal combustion engine with two camshafts for each cylinder bank, with the phase relationships of the camshafts being variable with respect to each other and with respect to the crankshaft.

BACKGROUND OF THE INVENTION

It is well known that spark ignition internal combustion engines will exhibit improved power and torque output, as well as reduced fuel consumption and exhaust emissions if such engines are equipped with variable valve timing operated with an optimized strategy.

With dual overhead camshaft engines, a first camshaft on each bank is usually operated either by single flexible, inextensible drive member such as a chain or belt or, alternatively, by gears from the crankshaft. With such a system, it is commonly known to shift the phase relationship between the crankshaft and both camshafts simultaneously by means of a belt-timing control system such as that shown in U.S. Pat. No. 5,088,456 to Suga, which is hereby incorporated by reference. The '456 patent discloses a type of so-called "dual-equal" system in which the intake and exhaust camshafts are phase shifted with respect to the crankshaft of the engine by the same amount. Although the dual-equal system will achieve certain benefits, it is generally incapable of changing the phase relationship between the camshafts of an individual cylinder bank. As will be explained below, it is desirable to have the capability to change the phase relationship between the dual camshafts on a cylinder bank.

U.S. Pat. No. 4,726,331 to Oyaizu discloses a system for changing the phase relationship between the intake and exhaust valves on a single cylinder bank of an engine. However, this system is incapable of changing the gross camshaft timing with respect to the crankshaft. More specifically, with the system of the '331 patent, the relationship between the exhaust camshafts and the crankshaft does not change. U.S. Pat. No. 5,109,813 to Trzmiel et al. discloses another system for altering the overlap between dual camshafts, with the system being responsive only to engine oil pressure. This system suffers from the deficiency that its dependency upon engine oil pressure renders it unable to control the camshaft phase relationship independently of engine speed. Although the concept of independently controlling the phase relationship between the crankshaft and both camshafts of a dual overhead camshaft setup is known, such a system would be very expensive and complex.

A system according to the present invention offers the advantage that the gross timing between both camshafts and the crankshaft can be controllably changed but, more importantly, the phase relationship between the two camshafts on a given bank of cylinders may also be controlled. This offers the important benefit of being able to change the valve overlap occurring between the opening of the intake valve and the closing of the exhaust valve. During operation at idle and very light loads, it is desirable to have little overlap between the opening of the intake valve and the closing of the exhaust valve. A small overlap is desired to minimize the fraction of the incoming intake charge which comprises exhaust gas remaining from the previous cycle because an excessive exhaust gas fraction will cause combustion instability at idle and, therefore, higher exhaust gas hydrocarbon emissions. On the other hand, at part loads, it is desirable to use exhaust gas recirculation ("EGR"); for this reason, external EGR valves and hardware have been installed on engines. Of course, such hardware is expensive and requires extra maintenance to keep the EGR system in order. Accordingly, if the valve overlap could be increased such that the number of degrees between the opening of the intake valve and the closing of the exhaust valve is increased, internal EGR could be increased, thereby obviating the need for an external EGR valve and its associated plumbing. A system according to the present invention uses variable valve overlap so as to provide variable internal EGR while also allowing a form of dual-equal phase-shifting.

SUMMARY OF THE INVENTION

A variable drive system for operating the cylinder valves of a reciprocating internal combustion engine includes a first camshaft driven by a crankshaft of the engine, a primary phaser means for coupling the first camshaft to the crankshaft and for varying the phase relationship between the crankshaft and the first camshaft, and a second camshaft driven by the first camshaft through a secondary phaser means which couples the first camshaft to the second camshaft and which also varies the phase relationship between the first and second camshafts. The first and second camshafts are preferably mounted to the cylinder head of an engine with the first camshaft operating one or more exhaust valves and the second camshaft operating one or more intake valves for each cylinder of the engine. The phase relationship between the crankshaft and the first camshaft may be infinitely varied by the primary phaser means whereas the phase relationship between the first camshaft and the second camshaft may be variable in finite steps by the secondary phaser means.

A system according to the present invention may further comprise an electronic control means for operating the primary and secondary phaser means, with the electronic control means sensing one or more engine operating parameters, such as engine speed and load, and adjusting the primary and secondary phase relationships according to the values of measured speed and load.

According to yet another aspect of the present invention, a first camshaft drives a second camshaft by means of a flexible, generally inextensible drive element which is trained over sprockets affixed to the camshafts, such that two chords of the drive element extend between said sprockets, and with said secondary phaser means comprising a variable position tensioner controlled by the electronic control means. The tensioner has elements bearing upon both drive element chords extending between the camshaft sprockets. The variable position tensioner comprising the secondary phaser preferably includes upper and lower tensioning elements with one of the tensioning elements being in contact with each chord of the drive element and with each of the two tensioning elements being carried upon a separate plunger mounted in a separate oil-filled barrel mounted to the cylinder head between the chords of the drive element such that the amount of oil within each barrel determines the position of both the plunger and the associated tensioning element mounted thereto. The amount of oil in the barrels is determined by the position of solenoid equipped check valves operated by the electronic control means such that oil will be caused to flow into one of the barrels from the other barrel when the tension of the chord of the drive element associated with the selected barrel is less than the tension of the chord associated with the non-selected barrel. In this manner, torque reversals imposed upon the camshafts by lift mechanisms interposed between the camshafts and the engine valves, will cause the actual movement of the tensioner elements and plungers into or away from their respective barrels.

According to yet another aspect of the present invention, the secondary phaser means has two stable positions corresponding to a position of lesser overlap between the opening of the intake valve and the closing of the exhaust valve, with this lesser overlap being applied when the engine is idling or is otherwise operating at low load, and a position of greater overlap between the opening of the intake valve and the closing of the exhaust valve which is applied when the engine is operated at medium loads. Other combinations of the position of the primary phaser and the secondary phaser are available according to the present invention.

DETAILED DESCRIPTION OF THE PREFERRED EMBODIMENTS

Figure 1:
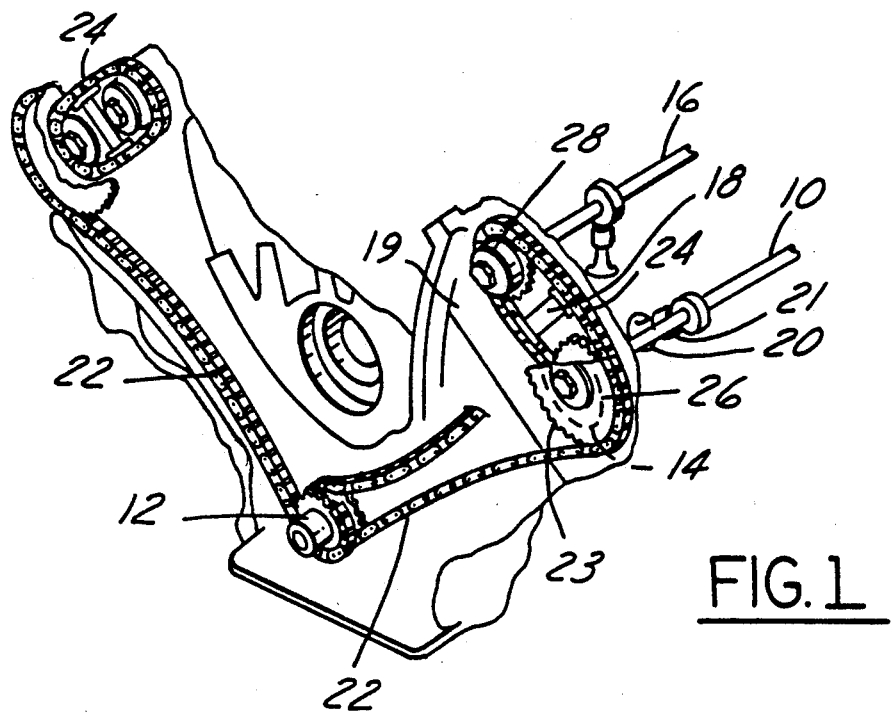
FIG. 1 is a schematic representation of an engine equipped with a variable camshaft drive system according to the present invention.

As shown in FIG. 1, a V-block engine has a crankshaft 12 driving first camshaft 10 of the cylinder bank which is on the right side of FIG. 1. Those skilled in the art will appreciate that a system according to the present invention could be used with an engine having but a single bank of cylinders or multiple banks of cylinders, it being understood that the present system is merely replicated for additional banks of cylinders.

Figure 2:
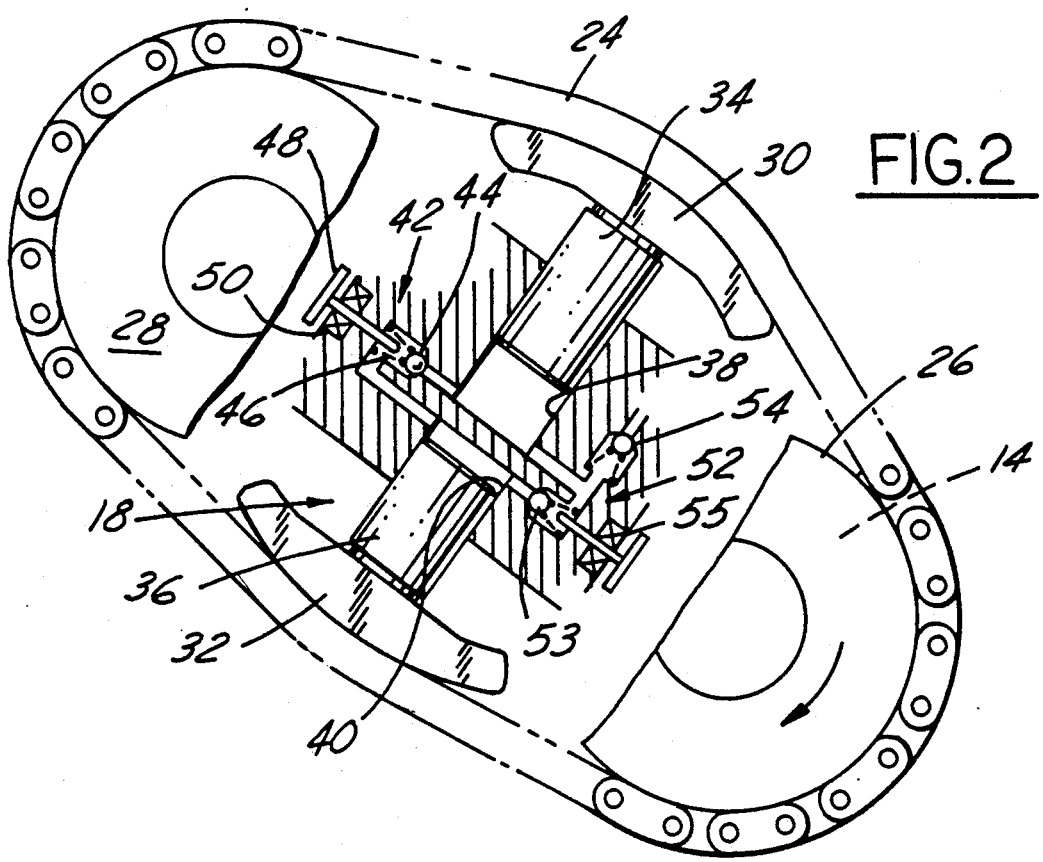
FIG. 2 is an end view of a portion of the camshaft drive system of the present invention showing with particularity a secondary phaser means for varying the phase relationship between camshafts on the same cylinder head.

Crankshaft 12 drives first camshaft 10 by means of primary timing chain 22, which may comprise a silent chain type of drive or a synchronous belt made of fiber reinforced elastomeric materials or other types of generally inextensible drive elements known to those skilled in the art and suggested by this disclosure. The engine shown in FIG. 1 is a dual overhead cam type of engine. Accordingly, not only first camshaft 10 but also a second camshaft 16 are mounted to cylinder head 19. As noted above, first camshaft 10 is driven directly by crankshaft 12 via primary timing chain 22 and primary driven sprocket 23. In turn, second camshaft 18 is driven by first camshaft 10. As shown in FIG. 2, drive sprocket 26, which is non-rotatably affixed to first camshaft 10 drives sprocket 28, which is non-rotatably affixed to second camshaft 16. In similar fashion to the primary drive of the engine, secondary timing chain 24, which is also a generally inextensible but flexible drive element, is trained over sprockets 26 and 28 such that two chords of drive element 24 extend between sprockets 26 and 28.

In conventional fashion, first camshaft 10 drives a plurality of exhaust valves 20 via a lift mechanism (in this case a plurality of bucket tappets 21, it being understood that only one poppet valve 20 and one tappet 21 is shown). Second camshaft 16 will accordingly operate the intake poppet valves (not shown) of each cylinder bank. The present invention takes advantage of torque reversals which operate upon the camshafts because of the forces imposed on the cam lobes by the bucket tappet lift mechanism. Because the poppet valves are conventionally urged into the closed position by coil springs (not shown), the tappets are also urged into the closed position by the valve springs. This force also acts upon the lobes of the camshaft and will cause the imposition of bi-directional torque pulses upon the camshafts.

Those skilled in the art will appreciate that the phase relationship between crankshaft 12 and first camshaft 10 is governed solely by primary phaser 14, which comprises any suitable device drawn from the class of known devices for changing the phase relationship between a crankshaft and the camshaft of an engine. Primary phaser 14 has an effect on the phase relationship of second camshaft 16 with respect to crankshaft 12, which relationship may be at least partially overridden by the action of secondary phaser 18. Primary phaser 14 may be of the infinitely variable type, whereas secondary phaser 18 may vary the phase relationship between the first and second camshafts in finite steps. In the present case, phaser 18 varies the phase relationship between first camshaft 10 and second camshaft 16 in two finite steps.

Figure 3:
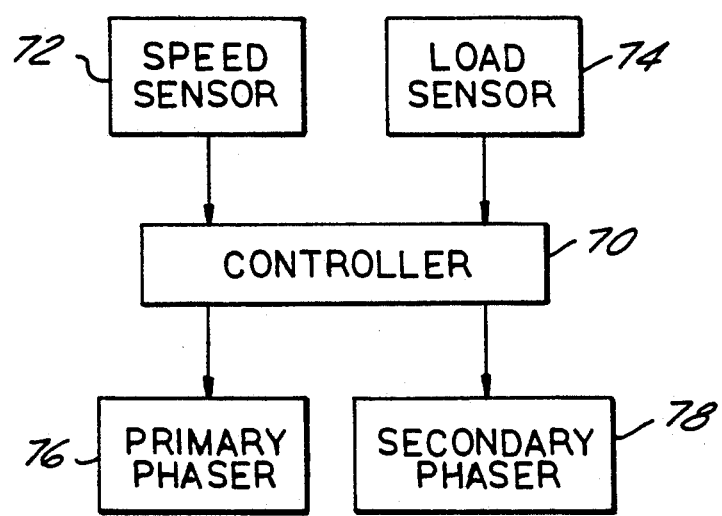
FIG. 3 is a block diagram showing the arrangement of a control system according to the present invention.

As shown in FIG. 3, electronic controller 70 receives information from speed sensor 72 and load sensor 74, which may comprise any of the commonly used speed and load sensors such as a throttle position sensor or manifold pressure sensor, or yet other sensors known to those skilled in the art of electronic engine control design and suggested by this disclosure. Controller 70 uses the speed and load information and, if desired, information from other engine operating parameters as well to determine the proper phase relationship between crankshaft 12 and the camshafts 10 and 16, as well as the proper phase relationship between camshafts 10 and 16 themselves. Set forth below is a table showing various engine operating modes and the position of the primary and secondary phasers, and also the timing of intake valve opening, intake valve closing, exhaust valve opening, and exhaust valve closing, and also the overlap between intake valve opening and exhaust valve closing for an 8-cylinder engine having an intake and exhaust duration of events of 250°.

TABLE

| Operating Mode | Primary Phaser | Secondary Phaser | IVO | IVC | EVO | EVC | |
|---|---|---|---|---|---|---|---|
| Overlap | | | | | | | |
| Idle | Full Ad | Ret | 12° BTDC | 58° ABDC | 62° BBDC | 8° ATDC | 20° |
| Light Load | 36° Ret | Ret | 24° ATDC | 94° ABDC | 26° BBDC | 44° ATDC | 20° |

TABLE-continued

| Operating Mode | Primary Phaser | Secondary Phaser | IVO | IVC | EVO | EVC | |
|---|---|---|---|---|---|---|---|
| Med Load | 40° Ret | Adv | 8° ATDC | 78° ABDC | 22° BBDC | 48° ATDC | 40° |
| Full L Low Sp | 14° Ret | Adv | 18° BTDC | 52° ABDC | 48° BBDC | 22° ATDC | 40° |
| Full L Md Sp | Full Ad | Ret | 12° BTDC | 58° ABDC | 62° BBDC | 8° ATDC | 20° |
| Full L High Sp, 20° | 6° Ret | Ret | 6° BTDC | 64° ABDC | 56° BBDC | 14° ATDC | 20° |

As shown in the table, when the engine is at idle, primary phaser 14 is in the fully advanced position, whereas secondary phaser 18 is in the retarded position. This means that the intake valve opens at 12° before top dead center and closes at 58° after bottom dead center, whereas the exhaust valve opens at 62° before bottom dead center and closes at 8° after top dead center. It should be noted that the intake valve opens before top dead center on the exhaust stroke of the engine. It is also shown in the first line of the Table that the overlap between the intake valve opening and the exhaust valve closing is 20°. The reader's attention is now directed to line 3 of the table, wherein at medium load, primary phaser 14 is operated in the 40° retard position, whereas secondary phaser 18 is operated in the advanced position. This means that the intake valve opens at 8° after top dead center, and closes at 78° after bottom dead center. Exhaust valve 20 opens at 22° before bottom dead center and closes at 48° after top dead center. Secondary phaser 18 produces an overlap between the opening of the intake valve and the closing of the exhaust valve which is 40°. Different overlaps are used because at idle, it is desirable to have minimal EGR so as to promote maximum combustion stability and minimum exhaust hydrocarbon emissions. At medium load, however, it is desirable to apply EGR to control the formation of oxides of nitrogen, and the 40° overlap between the intake valve opening and the exhaust valve closing allows increased internal EGR during medium load operation of line three of the Table. Note that in lines 5 and 6 of the Table which correspond to full load, medium speed operation, and full load, high speed operation, 20° of overlap is used.

Operation of the secondary phaser means will now be explained with reference to FIG. 2. Keeping in mind that sprocket 26 is the drive sprocket for chain 24, the chord running on the top of FIG. 2 will generally tend to be in tension, whereas the chord of chain 24 running on the bottom or lower part of FIG. 2 will generally tend to be slack. However, because of the previously explained torque reversals which are imposed upon the camshafts, the two chords of chain 24 will alternatively be placed in tension and allowed to become slack. This phenomenon assists secondary phaser 18 in accomplishing the phase change between camshafts 10 and 16.

The positions of upper tensioning element 30 and lower tensioning element 32 determine the phase relationship between camshafts 10 and 16. The upper and lower tensioning elements are carried upon separate plungers mounted in separate oil filled barrels mounted upon cylinder head 19 between the chords of drive element or chain 24, such that the amount of oil within each barrel determines the position of the plunger and its associated tensioning element. Upper plunger 34 is mounted in barrel 38, whereas lower plunger 36 is mounted in barrel 40. Barrels 38 and 40 are interconnected by means of passages such that the total amount of oil contained in the barrels remains relatively constant with make-up being provided by valve 54 from the engine's oil supply. Because the amount of oil within both barrels remains relatively constant, any movement of one plunger must be accompanied by a corresponding movement in the same linear direction by the other plunger. When controller 70 decides according to the control scheme shown in the Table that more overlap is needed, and increases the overlap from 20° to 40°, both upper tensioning element 30 and lower tensioning element 32 must move up so that upper plunger 34 extends into barrel 38 to an extent less than lower plunger 36 extends into barrel 40. For this to happen, controller 70 must appropriately control upper barrel solenoid valve 42 and lower barrel solenoid valve 52. The solenoid valves are constructed identically. Upper barrel solenoid valve 42 includes ball check 44 which is spring loaded against a seat by means of spring 46. Solenoid plunger 48 is selectively engageable by means of coil 50, which is operated by controller 70 by means of a suitable electronic driver of the type known to those skilled in the art and suggested by this disclosure. When either solenoid is energized, the associated plunger will maintain its check ball against the seat and prevent the flow of oil past the check ball. In this case, the solenoid of lower barrel solenoid valve 52 is energized and thereby keeps check ball 53 on its seat. Then as the torque reversals cause the upper and lower tensioning elements to press their respective plungers into the barrels, oil leaving barrel 38, will flow into barrel 40, causing upper plunger 34 to move downward. Lower plunger 36 will also move downward, with the result that the overlap between first camshaft 10 and second camshaft 16 will be reduced. Conversely, if it is desired to increase the overlap between first camshaft 10 and second camshaft 16, controller 70 will energize solenoid 50 associated with upper barrel solenoid valve 42. When solenoid 50 is energized, oil will not be allowed to pass around check ball 44, and as a result, the torque reversals imposed upon the camshafts which cause the chords above and below the camshafts to alternatively become tight and to go slack, will cause oil to flow from barrel 40 past check ball 53 and into barrel 38, thereby causing the overlap between the camshafts to increase as the length of the upper chord of chain 24 increases and the length of the lower chord decreases. As noted in the Table above, reduced or increased overlap may be employed at a variety of settings of the primary phaser.

Those skilled in the art will appreciate that the phase relationships described herein are merely exemplary and that the particular values of overlap produced by the secondary phaser, as well as the phase relationship between the camshafts and the crankshaft will be dictated by the requirements of the engine to which the present invention is being applied.

We claim:

1. A reciprocating internal combustion engine, comprising:

a crankshaft mounted within a cylinder block having one or more banks of cylinders, with each bank having a cylinder head with a plurality of camshaft operated poppet valves, and with at least one intake valve and at least one exhaust valve per cylinder;

a first camshaft mounted to the cylinder head of one bank and driven by the crankshaft, with said first camshaft operating a first set of poppet valves through a lift mechanism;

a second camshaft mounted to the cylinder head of of the first camshaft and driven by the first camshaft by means of a flexible, generally inextensible drive element which is trained over sprockets affixed to said camshafts such that two chords of said drive elements extend between said sprockets, with said second camshaft operating a second set of poppet valves through a lift mechanism;

primary phaser means for coupling the first camshaft to the crankshaft and for varying the primary phase relationship between the crankshaft and said first camshaft; and secondary phaser means for varying the phase relationship between the first and second camshafts, with said secondary phaser means comprising a variable position tensioner controlled by an electronic control means, with said tensioner having tensioning elements bearing upon both drive element chords extending between the camshaft sprockets, and comprising upper and lower tensioning elements, with each of said tensioning elements being carried upon a separate plunger mounted in a separate oil-filled barrel mounted to said cylinder head between the chords of the drive element such that the amount of oil within each barrel determines the position of both the plunger and the associated tensioning element mounted thereto, with said secondary phaser further comprising control valve means operated by said electronic control means for allowing oil to flow between the barrels to achieve the desired secondary phase relationship.

2. An engine according to claim 1, wherein said control valve means comprises solenoid equipped check valves positioned in separate oil passages extending between said barrels and operated by said electronic control means such that oil will be caused to flow into a selected barrel from a non-selected barrel when the tension of the chord of the drive element associated with the selected barrel is less than the tension of the chord associated with the non-selected barrel, due to torque reversals imposed upon said camshafts by said lift mechanisms, with the result that the secondary phase relationship will be changed.

3. An engine according to claim 1, wherein said secondary phaser means has two stable positions corresponding to a position of lesser overlap between the opening of the intake valve and the closing of the exhaust valve which is applied when the engine is idling or otherwise operating at low load, and a position of greater overlap between the opening of the intake valve and the closing of the exhaust valve which is applied when the engine is operated at medium loads.

4. An engine according to claim 1, wherein said secondary phaser means is set for the position of lesser overlap when the engine is operating at full load at high or medium speed.

5. An engine according to claim 1, wherein said primary phaser means is set to a position of full advance and said secondary phaser means is set to a position of lesser overlap when the engine is operating either at idle or at full load and medium speed.

* * * * *